(12) United States Patent
Armenia et al.

(10) Patent No.: US 6,546,951 B1
(45) Date of Patent: Apr. 15, 2003

(54) APPLIANCE SAFETY HOSE

(76) Inventors: John G. Armenia, P.O. Box 716, Sanibel, FL (US) 33957; Alfred L. Calciano, P.O. Box 716, Sanibel, FL (US) 33957

( * ) Notice: Subject to any disclaimer, the term of this patent is extended or adjusted under 35 U.S.C. 154(b) by 39 days.

(21) Appl. No.: 09/772,760

(22) Filed: Jan. 30, 2001

Related U.S. Application Data
(60) Provisional application No. 60/209,445, filed on Jun. 5, 2000.

(51) Int. Cl.[7] ................................................ E03B 7/08
(52) U.S. Cl. .................... 137/312; 138/114; 285/13; 285/123.1
(58) Field of Search ........................... 137/312; 138/114; 285/13, 123.1; 73/49.1

(56) References Cited

U.S. PATENT DOCUMENTS

| | | | |
|---|---|---|---|
| 6,446,661 B2 * | 9/2002 | Armenia et al. | ............. 137/312 |
| 6,446,671 B2 * | 9/2002 | Armenia et al. | ......... 138/114 X |

FOREIGN PATENT DOCUMENTS

| EP | 0474569 | * | 3/1992 |
|---|---|---|---|

* cited by examiner

*Primary Examiner*—Kevin Lee
(74) *Attorney, Agent, or Firm*—William E. Noonan

(57) ABSTRACT

A safety hose apparatus delivers water from a standard threaded hose bib to an appliance or plumbing fixture. The apparatus includes an outer hose and an inner hose that extends through the outer hose. A first threaded connector is rotatably attached to the outer hose and is in communication with the inner hose. The first threaded connector is threadably engagable with the spout to communicably connect the inner hose to the hose bib. A second threaded connector is rotatably attached to the outer hose and is in communication with the second end of the inner hose. The second threaded connector is threadably engagable with the inlet to communicably connect the inner hose to the inlet. A first closure is engaged with the first end of the outer hose and a second closure is engaged with a second end of the outer hose for sealing the space between the inner and outer hoses and retaining within the space water leaking through a rupture in the inner hose. The first threaded connector is peripherally exposed by the first end of the outer hose sufficiently to prevent unhindered rotation of the first threaded connector about the outer hose so that the first connector may be threadably with and disengaged from the spout and the second threaded connector is peripherally exposed by the second end of the outer hose sufficiently to permit unhindered rotation of the second threaded connector relative to the outer hose so that the second connection may be threadably engaged with and disengaged from the inlet.

21 Claims, 3 Drawing Sheets

APPLIANCE SAFETY HOSE

RELATED APPLICATION

This application claims the benefit of U.S. Provisional Patent Application Ser. No. 60/209,445 filed Jun. 5, 2000.

FIELD OF THE INVENTION

This invention relates to a safety hose apparatus for delivering water from a standard hose bib to an appliance that utilizes water. More particularly, this invention relates to a safety hose apparatus for washing machines, dishwashers, other appliances and plumbing fixtures.

BACKGROUND OF THE INVENTION

Various types of appliances, including washing machines and dishwashers as well as assorted plumbing fixtures, such as toilets and sinks, must be interconnected through a hose to a source of water. Conventional water hoses, which are normally composed of rubber or plastic, tend to wear and break down over time. Deterioration is caused, for example, by bending of the hose and the repeated passage of water through the hose. Hot water hoses are particularly susceptible to wear because of the stresses caused by repeated changes in temperature. Hose life is also affected by the water quality, water pressure, geographic locale and frequency of use. As the hose deteriorates, ruptures are likely to occur. Eventually, the hose may rupture or burst, which can result in flooding and serious water damage to the room or building in which the appliance is located, as well as items located therein. Aggravating and extremely expensive repairs may be necessitated.

Various techniques and procedures have been employed to combat leaks and ruptures in water hoses. Certain of these devices employ sophisticated electronic sensors that detect leakage in the hose and shut off the supply of water to the hose by closing a valve proximate the hose bib. These products are invariably expensive and virtually impossible for most homeowners to install. They have not significantly reduced the problem of ruptured appliance hoses.

Renner, U.S. Pat. No. 4,930,549 discloses a technique for installing a pair of protective sleeves respectively on the hot and cold water hoses of a washing machine. A drainage hose is interconnected between the sleeves for conducting water that leaks from either of the hoses to a standard drain line. This procedure is complicated, time consuming, labor intensive and wholly impractical. The protective sleeve must be cut in various locations and installed in several segments. Up to 20 fittings and clamps must be used and these components cannot be tested until the protective sleeve is fully installed on the hose. Accordingly, the system operates unreliably. If the hose segments or fittings are not properly and precisely fitted, potentially damaging leaks are still very likely to occur. Moreover, the protective sleeves must be wrapped completely about and secured to both the hose bib spout and the inlet of the washing machine. And the outer sleeve can be installed only after the inner hose is already interconnected between the hose bib and the appliance inlet. As a result, the Renner technique is a time consuming and tedious procedure that usually requires the expertise of an expensive professional plumber.

SUMMARY OF INVENTION

It is therefore an object of the present invention to provide an improved, yet greatly simplified safety hose for appliances and plumbing fixtures that utilize water.

It is a further object of this invention to provide a universal safety hose that comprises a fully factory assembled product, which may be installed quickly and conveniently on a wide variety of appliances and plumbing fixtures, including but not limited to washing machines and dishwashers.

It is a further object of this invention to provide a safety hose that employs a relatively simple, uncomplicated and inexpensive construction including no clamps, only a single continuous length of outer hose and only two universal fittings.

It is a further object of this invention to provide a safety hose that operates effectively and reliably to prevent water leaks and resulting damage.

It is a further object of this invention to provide a safety hose that is conveniently assembled and pressure tested at the factory so that installation is facilitated and consistently reliable and relatively fail-safe operation is achieved.

It is a further object of this invention to provide a safety hose employing a protective outer hose that is never under water pressure and which thereby resists rupturing.

It is a further object of this invention to provide a safety hose that employs an outer sleeve or hose which is not attached directly to the hose bib or the appliance inlet so that installation of the apparatus is facilitated considerably.

It is a further object of this invention to provide a safety hose that is easily and inexpensively installed, even by homeowners and lay persons having no plumbing expertise.

This invention results from a realization that a pre-assembled, factory tested safety hose may be constructed simply and inexpensively by employing a pair of end fittings that carry respective rotatable threaded connectors and by utilizing a pair of inner and outer hoses that are permanently interconnected between the end fittings such that the outer hose extends continuously between the end fittings and the ends of the outer hose are spaced apart from respective rotatable connectors. This permits the safety hose to be quickly and conveniently installed by simply screwing the threaded connectors onto the hose bib and the appliance or plumbing fixture inlet, respectively.

This invention features a safety hose apparatus for delivering water from a threaded spout of a hose bib to a threaded appliance inlet. The apparatus includes an outer hose and an inner hose that extends through the outer hose. A first pipe is communicably connected to a first end of the inner hose. The first threaded connector is rotatably attached to the outer hose in communication with the first pipe. The first threaded connector is threadably engagable with the threaded spout to communicably connect the first pipe and the inner hose to the hose bib. A second pipe is communicably connected to a second end of the inner hose. A second threaded connector is rotatably attached to the outer hose in communication with the second pipe. The second threaded connector is threadably engagable with the threaded inlet to communicably connect the second pipe and the inner hose to the inlet. A first closure is attached to the first end of the outer hose and a second closure is attached to the second end of the outer hose for sealing the space between the inner and outer hoses and retaining within that space water leaking through a rupture in the inner hose. The first threaded connector is peripherally exposed by the first end of the outer hose sufficiently to permit unhindered rotation of the threaded connector about the outer hose so that the first connector may be threadably engaged with and disengaged from the spout. The second threaded connector is peripherally exposed by the second end of the outer hose sufficiently to permit unhindered rotation of the second threaded connector relative to the outer hose so that the second connector may be threadably engaged with and disengaged from the appliance inlet.

In a preferred embodiment, the first and second threaded connectors comprise generally annular components. The first connector may be rotatably attached to the first pipe and the second connector may likewise be rotatably attached to the second pipe. The first closure include an annular flange that is connected to and extends radially from the first pipe within the first threaded connector. Likewise, the second closure may include an annular flange that is connected to and extends radially from the second pipe within the second threaded connector. The pipes may extend through respective central openings in the first and second threaded connectors. The first closure may include at least one annular washer that is engaged and generally axially aligned with the flange. The first closure may be urged to sealingly interengage the inner and outer hoses when the first threaded connector is engaged with the threaded spout. Similarly, the second closure may include at least one annular washer that is engaged and generally axially aligned with the flange of the second pipe. The second closure may be urged to sealingly interengage the inner end and outer hoses when the second threaded connector is engaged with the threaded appliance inlet. Each of the closures may comprise a pair of annular washers, with one of the pair of washers being disposed on one side of a respective flange and the other washers being disposed on the opposite side of that flange. The outer hose may include a drain conduit that directs leaking water from the outer hose to a drain pipe.

DETAILED DESCRIPTION OF PREFERRED EMBODIMENTS

Other objects, features and advantages will occur from the following description of preferred embodiments and the accompanying drawings, in which.

Figure 1:
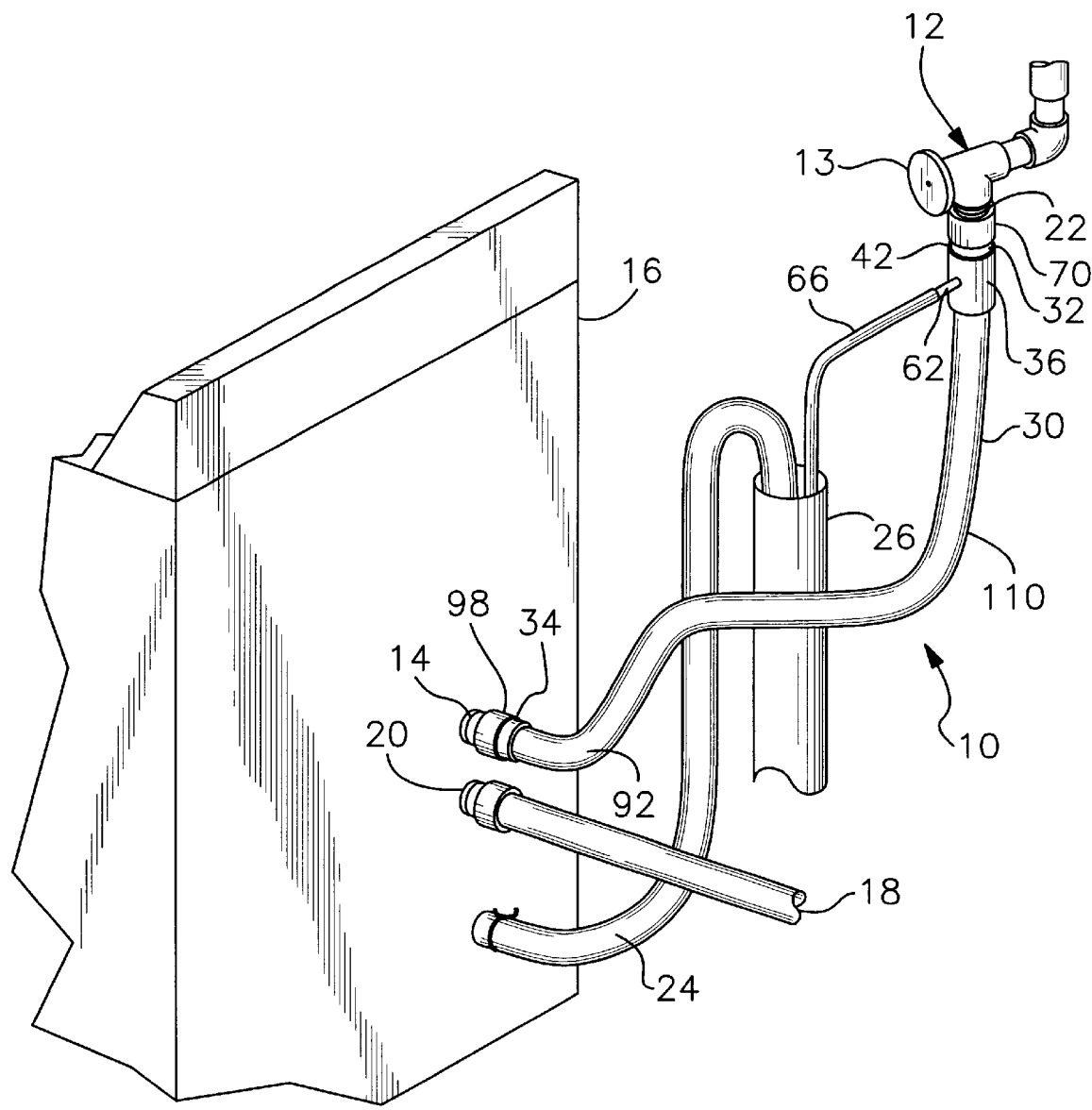
FIG. 1 is a perspective view of a washing machine utilizing the safety hose apparatus of this invention.

There is shown in FIG. 1. a safety hose apparatus 10 for delivering water from a standard hose bib 12 to the inlet 14 of a washing machine 16. Hose bib 12 represents the usual hot water source for the washing machine. An analogous safety hose apparatus may be utilized for the cold water line. However, it is particularly preferred that apparatus 10 be employed for the hot water line because that line is subject to greater stresses due to the relatively high temperature of water usually delivered through the hose. For simplicity, apparatus 10 is shown herein attached only between the hot water bib 12 and washing machine 16. A standard cold water conduit 18 is secured to cold water inlet 20 in a conventional manner. Although a washing machine is depicted in this embodiment it should be understood that apparatus 10 may be employed with a wide variety of other appliances that are connected to a source of water. As used herein "appliance" includes all types of machines and also includes plumbing fixtures such as toilets and sinks.

Hose bib 12 includes a threaded spout 22. Washing machine inlet 14 is likewise externally threaded. The hose bib includes a valve handle 13, which rotates about a horizontal axis. The valve handle is opened to provide water to the washing machine in a known manner. A standard washing machine drain hose 24 discharges water from washing machine 16 and empties that water into a conventional drain pipe 26.

Figure 2:
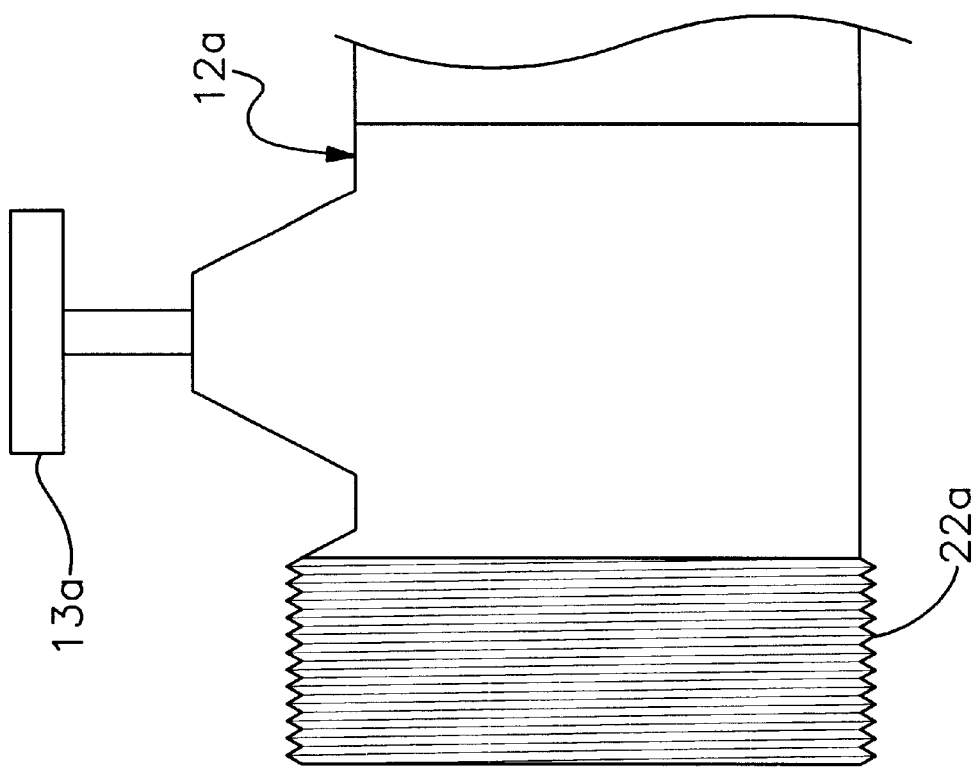
FIG. 2 is an elevated, partly cross sectional view of the end of safety hose apparatus that is releasably attached to a threaded spout of a standard hose bib.
Figure 2:
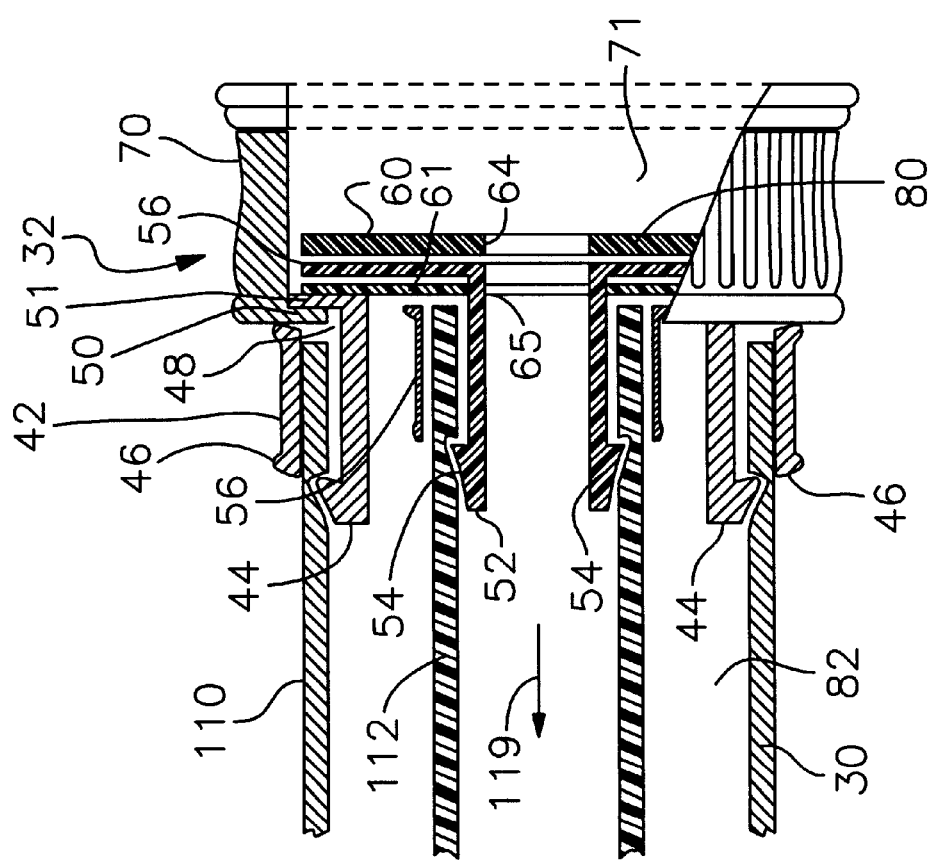

In FIG. 2, the hose bib is altered slightly in a known manner. Specifically, hose bib 12a includes a threaded spout 22a that extends in an axially horizontal manner. Valve handle 13a is mounted such that it rotates about a vertical axis. Although positioned somewhat differently, both hose bibs 12 and 12a operate in an analogous manner. In fact, the safety hose of this invention may be employed with all types of threaded hose bibs.

Figure 3:
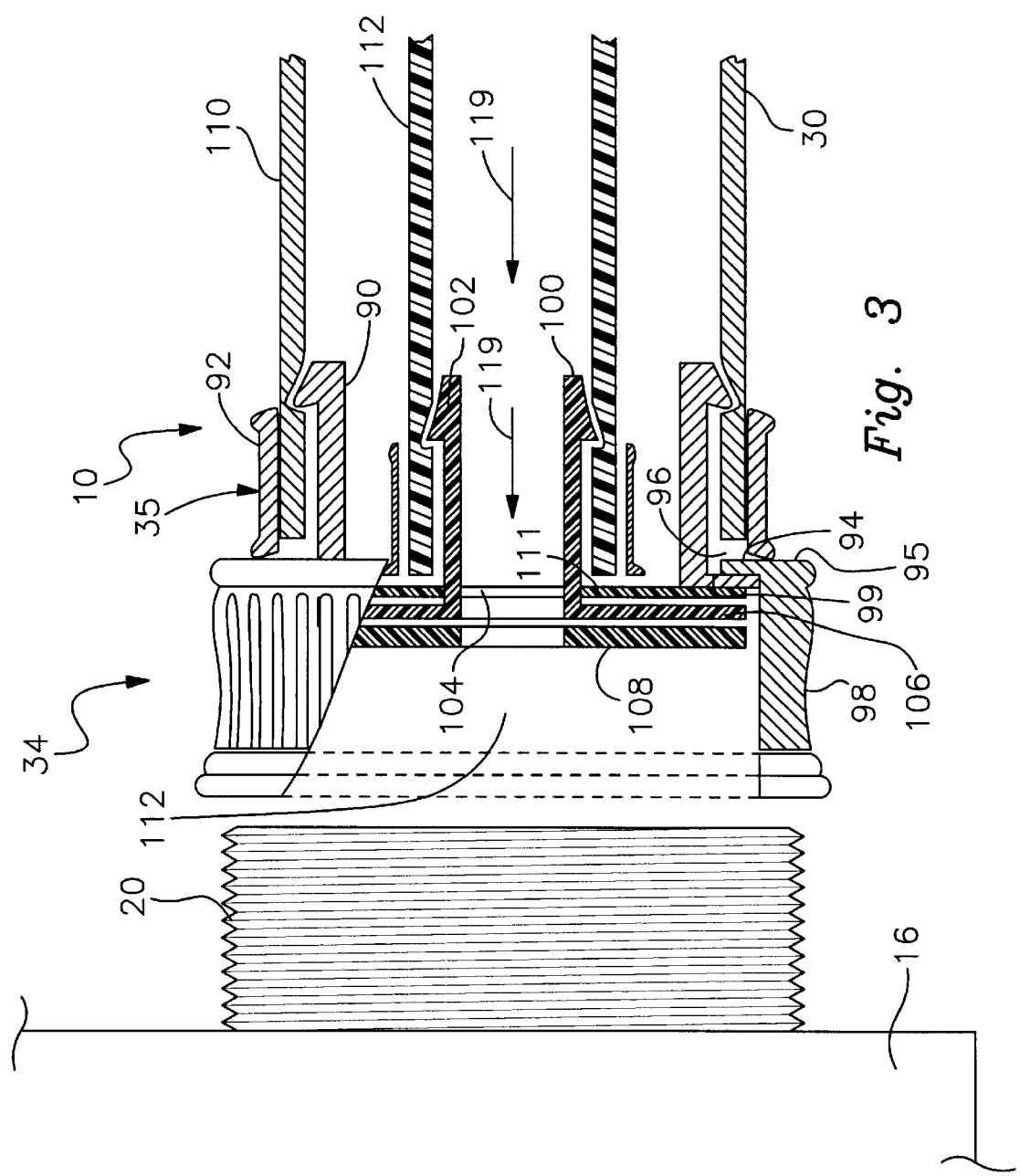
FIG. 3 is an elevational, partly cross sectional view of the opposite end of the safety hose apparatus, which is selectively interengagable with a threaded appliance inlet.

Hose apparatus 10 includes an elongate outer conduit or hose assembly 30 interconnected between a first end fitting 32, FIGS. 1 and 2, and a second end fitting 34, FIGS. 1 and 3. The first and second end fittings 32 and 34 comprise a plurality of pieces that may be composed of various types of non-corrosive metal or plastic material. It should be understood that the end fittings may be constructed in a wide variety of ways. Nonetheless, it is essential that each end fitting includes a generally annular threaded connector that attaches one end of hose assembly 30 to a respective one of the threaded spout 22 and the threaded appliance inlet 14. Each fitting also includes some type of structure that seals the respective end of hose assembly 30 so that in the event of a leak or rupture in the inner hose, water is retained in outer hose assembly 30 in a manner which will be described more fully below.

The construction of hose assembly 30 and end fittings 32 and 34 is shown in FIGS. 1–3. More particularly, hose assembly 30 includes an elongate outer conduit or hose 110 and an elongate inner conduit or hose 112 that extends centrally through hose 110. The inner and outer hoses may be composed of standard hose material. Specifically, they may employ reinforced rubber or a plastic material. A flexible or corrugated metal may also be employed. Such materials should be well known to persons skilled in the hose art. In some cases, as shown in FIGS. 2 and 3, the inner and outer hoses 110 and 112 may extend continuously in an uninterrupted fashion between fittings 32 and 34. Alternatively, a generally cylindrical discharge conduit segment 36, FIG. 1, may be incorporated into outer hose 110. Segment 36 may be unitarily joined with outer hose 110 or otherwise fastened to hose 110 in a standard manner. Segment 36 includes a transverse discharge port 62 that serves to discharge water that has leaked from a ruptured inner hose 112. This is explained more fully below. Segment 36 may be employed at various different locations along the length of hose assembly 30. In other embodiments, such as in FIGS. 2 and 3, a discharge section and accompanying discharge port may be omitted entirely.

End fitting 32 is illustrated in detail in FIG. 2. Fitting 32 includes a generally annular threaded connector 70, which resembles the threaded connector typically used at the hose bib end of a standard household appliance (e.g. washing machine) or garden hose. Connector 70 is rotatably attached to a first end of outer hose 110 by a standard crimped retainer assembly 42. This assembly includes a generally cylindrical insert 44 and a cylindrical ferrule 46 that are pinched or crimped together and sandwiched about the first end of outer hose 110 in a known manner. Connector 70 is rotatably engaged with an annular slot 48 formed in assembly 42. Specifically, connector 70 includes a radial base 50 that is turned inwardly and received movably by slot 48. Lip 50 interengages the radially outwardly extending lip 51 of insert 44. This holds connector 70 to connector 42 and permits the threaded connector to rotate relative to outer hose 110. As a result, threaded connector 70 is permanently but rotatably attached to retainer assembly 42. Threaded connector 70 has a threaded interior surface 71.

Inner hose 112 is received centrally through hose 110. The inner hose is itself rotatably and communicably secured to threaded connector 70. This is accomplished by the use of a first pipe 52 that is received by the first end of hose 112. Pipe 52 grips hose 112 by means of a detent or rib 54. An interior ferrule 56 is disposed about the outer surface of hose 112 proximate its first end. The ferrule is crimped against the inner hose and pipe such that the inner hose is secured between ferrule 56 and pipe 54. The above described techniques for crimping the inner and outer hoses are performed at the factory or manufacturing facility using processes that will be known to persons skilled in the art.

Pipe 52 extends through the central opening of threaded connector 70. The upper end of pipe 52 carries a radial flange 56 that is disposed within the boundaries of connector 70. It is critical that hose 112 be in fluid communication with threaded connector 70. In certain embodiments, the pipe and flange may be omitted and hose 112 may be connected in some other fashion to the threaded connector.

A pair of gaskets comprising annular washers 60 and 61 are disposed within threaded connector 70 on opposite sides of flange 56. The central openings 64 and 65 in washers 60 and 61, respectively, are aligned with the central openings in pipe 52 and connector 70. Flange 56 and adjoining washers 60 and 61 effectively form a closure 80 at the first end of hose assembly 30. In the event that there is a leak or rupture in inner hose 112, closure 80 acts as a seal and retains that water within the space 82 between the inner and outer hoses. This operation is explained more fully below. In alternative embodiments the inner hose may be attached to the threaded connector by means other than the pipe and flange shown herein.

The opposite, second end of safety hose apparatus 10 is depicted in FIG. 3. Therein, second fitting 34 is positioned to be attached to threaded inlet 20 of appliance 16. Fitting 34 includes a threaded annular connector 98 constructed analogously to connector 70 and rotatably attached to the opposite second end of outer hose 110. Fitting 34 includes an annular retainer assembly 35 comprising an insert 90 and a ferrule 92. These components are engaged with the inner and outer surfaces of hose 110 proximate the second end of that hose. Components 90 and 92 are crimped or otherwise machined together such that they are secured permanently to the second end of outer hose 110. Threaded connector 98 includes an inwardly turned base 94 that is slidably received in an circumferential slot 96 formed in retainer 35. Inwardly turned lip 99 of insert 90 interferes with inwardly turned lip 96 of connector 98 and thereby retains connector 98 in rotatable interengagement with connector 34.

A second pipe 100 is inserted within inner hose 112 and attached to the hose by a gripping rib 102. Pipe 100 extends through the central opening 104 in connector 98. A flange 106 is connected unitarily to pipe 100 and extends radially outwardly therefrom within the periphery of threaded connector 98. A pair of annular washers 108 and 111 are disposed on respective sides of flange 106. Washers 108 and 111 are composed analogously to the previously described washers. The washers include central openings that are aligned with the opening in the base 95 of connector 98. The connector has internal threads 112 that allow connector 98 to releasably interengage the threads of appliance inlet 20. Washers 108, 111 and flange 106 again define a closure which, in this case is located at the opposite, second end of hose assembly 30. Essentially, the space 82 between the inner hose 112 and the outer hose 110 is sealed by the closures of the opposing ends of the hose assembly, particularly when the threaded connector 98 is engaged with threaded inlet 20 and connector 70 is engaged with spout 22, 22a. Once again, it should be understood that in alternative embodiments the central hose may be communicably connected directly to threaded connector. The pipe and associated flange may be eliminated.

The inner and outer hose segments may be composed of various flexible, water resistant materials including rubber, neoprene and a wide variety of other natural and plastic substances. In certain versions one or more of the hoses may have a corrugated configuration. The drainage port segment 36 may be installed at various locations along the length of the hose assembly. Various known means may be used for fastening the drainage port section to the remainder of the outer hose. Preferably, the entire safety hose apparatus 10 is mass produced or otherwise fully assembled and tested at the factory. It should be understood that the end fittings and the particular components of those fittings are merely intended to be preferred representative means for accomplishing the purpose of this invention. In alternative embodiments, various other types of structure may be used.

Safety hose apparatus 10 is installed quickly and conveniently. First, the homeowner or other installer turns off the valve 13 at hose bib 12, 12a. The old hose interconnecting the bib and the appliance is then removed and discarded. Next, fully assembled apparatus 10 is installed. In the version disclosed herein, the new safety hose apparatus 10 comprises an outer hose having a pair of rotatable connectors formed permanently at respective ends thereof. An inner hose extends through the outer hose and is rotatably and communicably connected to the rotatable connectors by means of the respective flanged pipes. The flanges and adjoining washers form the closures at each end of the safety hose apparatus. To install apparatus 10, threaded connector 70 is screwed onto threaded spout 22 or 22a. The opposite threaded connector 98 is similarly screwed onto threaded appliance inlet 14. Finally, a drain hose 66, FIG. 1, is optionally attached to drain port 62 in cases where a drain conduit segment 36 is employed. Hose 66 is inserted into the standard appliance drain pipe 26. Apparatus 10 is now fully installed and ready for use. When threaded connectors 98 and 70 are attached to appliance inlet 14 and threaded spout 22, 22a, respectively, the washers are tightened against the distal ends of the hoses. As a result, the washers and the flanges (about which the washers are sandwiched) form effective sealing closures at each end of the safety hose apparatus.

To operate appliance 16, valve 13, 13a is opened. Each time the washing machine or other appliance is used, water is delivered through the apparatus 10 from the hose bib to the appliance inlet 14. Specifically, water is introduced through connector 70 into first pipe 52. Water travels in the direction of arrow 119, FIG. 2, through inner hose 112. As shown in FIG. 3, this water eventually reaches second pipe 100. The water exits through pipe 100 as indicated by arrows 119 in FIG. 3 and is introduced through discharge connector 98 into inlet 14 of appliance 16. During normal operation, the appliance uses the water and eventually discharges the water through drain line 24, FIG. 1, into drain pipe 26.

In the event that a crack, break, leak or other rupture occurs in hose 112, water enters the space 82 between inner hose segment 112 and outer hose segment 110. The closures formed at respective ends of the apparatus serve effectively to plug or stopper the ends of outer hose 110 and retain water within space 82. This water is discharged through outlet port 62, FIG. 1, into drain hose 66. The drain hose conducts the water into drain pipe 26, FIG. 1. As a result, the leaking water is captured by the outer hose 110 and released into the standard drain pipe. Potentially expensive damage to the room, building and/or furniture is thereby avoided.

In alternative embodiments, the permanent outlet 62 and drain hose 66 may be omitted. In such versions, the device preferably employs some type of indicator, which warns the homeowner that the inner hose has burst or otherwise ruptured. A visual or audio indicator may be employed. In such embodiments, when the inner hose bursts or ruptures, the outer hose prevents water from leaking into the room. Water continues to be delivered to and used by the appliance. The use of some type of warning indicator is desirable in such cases because eventually the outer hose may deteriorate and leak. It should be noted that a warning indicator may also be employed when a drain conduit is used, as in the above described manner.

It should be noted that in alternative embodiments, the closures may be formed by various other types of structure. For example, each end fitting may include structure as shown in our U.S. Pat. No. 5,931,184 issued Aug. 3, 1999. The closure may also be formed by other single or multiple part components. In all versions, the threaded connector at each end of the hose assembly should be exposable sufficiently by the outer hose such that the connector is freely rotatable by hand and thereby easily engaged with and disengaged from either the hose bib spout or the appliance inlet. Additionally, a closure should be formed at each end of the outer hose so that water leaking from a hole or rupture in the inner hose is retained within the space between the hoses. A drain port may then be provided for removing this water from the space. The drain outlet may be located at various positions along the length of the safety hose apparatus.

Accordingly, the present invention features a very reliable, easy to install and inexpensively manufactured safety hose that is suitable for use on washing machines, dishwashers and all types of appliances and plumbing fixtures utilizing water. Only two universal fittings are required and these fittings may be pressure tested at the factory. Installation is quick, simple and inexpensive. Clamps and multiple sleeve segments are eliminated. Reliable protection is provided against potentially catastrophic hose ruptures. Because each end of the outer hose is fastened to a respective fitting at a point that fully exposes the rotatable threaded connector, the entire product may be installed by virtually anyone in only a few moments. The prior art, which requires that the outer sleeve be attached directly to and cover the threaded connectors, does not permit such an installation. Accordingly, the known art teaches a fairly intricate and costly installation procedure for covering an existing hose. In contrast, the present invention discloses a fully assembled, factory tested product that is installed quickly, simply and inexpensively onto the appliance.

Although specific features of the invention are shown in some drawings and not others, this is for convenience only, as each feature may be combined with any or all of the other features in accordance with the invention.

Other embodiments will occur to those skilled in the art and are within the following claims.

What is claimed is:

1. A safety hose apparatus for delivering water from a threaded spout of a hose bib to a threaded appliance inlet, said apparatus comprising:

an outer hose;

an inner hose extending through said outer hose such that a space is formed between said inner and outer hoses;

a first pipe communicably connected to a first end of said inner hose;

a first threaded connector rotatably and sealably attached to said outer hose at a first end of said out hose and communicating with said first pipe, said first threaded connector being threadably engagable with the threaded spout to communicably connect said first pipe and said inner hose to the hose bib;

a second pipe communicably connected to a second end of said inner hose;

a second threaded connector rotatably and sealably attached to said outer hose at an opposite, second end of said outer hose and communicating with said second pipe, said second threaded connector being threadably engagable with the threaded inlet to communicably connect said second pipe and said inner hose to the inlet; and a first closure engaged with said first end of said outer hose, and a second closure engaged with said second end of said outer hose for sealing the space between said inner and outer hoses, at least when said first and second connectors are engaged with the spout and appliance inlet respectively, to retain within said space water leaking through a rupture in said inner hose;

said first threaded connector being peripherally exposed by said first end of said outer hose sufficiently to permit unhindered rotation of said first threaded connector about said outer hose so that said first connector may be threadably engaged with and disengaged from the spout, and said second threaded connector being peripherally exposed by said second end of said outer hose sufficiently to permit unhindered rotation of said second threaded connector relative to said outer hose so that said second connector may be threadably engaged with and disengaged from the inlet.

2. The apparatus of claim 1 in which said first connector is rotatably attached to said first pipe.

3. The apparatus of claim 2 in which said first pipe extends through a central opening in said first threaded connector.

4. The apparatus of claim 3 in which said first closure includes an annular flange that is connected to and extends radially from said first pipe within said first threaded connector.

5. The apparatus of claim 4 in which said first closure further includes at least one annular washer that is engaged and generally axially aligned with said flange, said first closure being urged to sealingly interengage said inner and outer hoses when said first threaded connector is engaged with the threaded spout.

6. The apparatus of claim 1 in which said second connector is rotatably attached to said second pipe.

7. The apparatus of claim 2 in which said second pipe extends through a central opening in said second threaded connector.

8. The apparatus of claim 3 in which said second closure includes an annular flange that is connected to and extends radially from said second pipe within said second threaded connector.

9. The apparatus of claim 4 in which said second closure further includes at least one annular washer that is engaged and generally axially aligned with said flange, said second closure being urged to sealingly interengage said inner and outer hoses when said second threaded connector is engaged with the threaded spout.

10. The apparatus of claim 1 further including drain conduit means attached to and communicating with said outer hose for discharging liquid from between said hoses into a standard appliance drain pipe.

11. An apparatus for delivering water from a threaded spout of a hose bib to a threaded appliance, said apparatus comprising:

an outer conduit;

an inner conduit extending through said outer conduit such that a space is formed between said inner and outer conduits;

a first threaded connector rotatably and sealably attached to said outer conduit at a first end of said outer conduit and in communication with said inner conduit, said first threaded connector being threadably engagable with the threaded spout to communicably connect said inner hose to the hose bib;

a second threaded connector rotatably and sealably attached to said outer conduit at an opposite, second end of said conduit and communicably attached with said inner conduit, said second threaded connector being threadably engagable with the threaded inlet to communicably connect said inner conduit to the inlet;

a first closure engaged with said first end of said outer conduit and a second closure engaged with said second end of said outer conduit for sealing the space between said inner and outer conduits, at least when said first and second connector are engaged with the spout and appliance inlet respectively, to retain within said space water leaking through a rupture in said inner conduit;

said first threaded connector being peripherally exposed by said first end of said outer conduit sufficiently to permit unhindered rotation of said first threaded connector about said outer conduit so that said first connector may be threadably engaged with and disengaged from the spout, and said second threaded connector being peripherally exposed by said second end of said outer conduit sufficiently to permit unhindered rotation of said second threaded connector relative to said outer conduit so that said second connector may be threadably engaged with and disengaged from the inlet.

12. The apparatus of claim 11 further including a drain conduit attached to said outer conduit for discharging liquid from between said conduits into a standard drain pipe.

13. The apparatus of claim 11 in which at least one of said first and second threaded connectors comprising a generally annular component.

14. The apparatus of claim 11 further including a first pipe for communicably interconnecting said first threaded connector and said inner hose in which said first connector is rotatably attached to said first pipe.

15. The apparatus of claim 14 in which said first closure includes an annular flange that is connected to and extends radially from said first pipe within said first threaded connector.

16. The apparatus of claim 14 in which said first pipe extends through a central opening in said first threaded connector.

17. The apparatus of claim 16 in which said first closure further includes at least one annular washer that is engaged and generally axially aligned with said flange, said first closure being urged to sealingly interengage said inner and outer hoses when said first threaded connector is engaged with the threaded spout.

18. The apparatus of claim 14 further including a second pipe communicable interconnecting said second connector and said inner hose and in which said second connector is rotatably attached to said second pipe.

19. The apparatus of claim 14 in which said second pipe extends through a central opening in said second threaded connector.

20. The apparatus of claim 14 in which said second closure includes an annular flange that is connected to and extends radially from said second pipe within said second threaded connector.

21. The apparatus of claim 19 in which said second closure further includes at least one annular washer that is engaged and generally axially aligned with said flange, said second closure being urged to sealingly interengage said inner and outer hoses when said second threaded connector is engaged with the threaded spout.

* * * * *